(12) United States Patent
Stauber et al.

(10) Patent No.: US 12,030,152 B2
(45) Date of Patent: Jul. 9, 2024

(54) TOOL-CHECKING DEVICE IN A WORKPIECE PROCESSING MACHINE

(71) Applicant: Blum-Novotest GmbH, Gruenkraut-Gullen (DE)

(72) Inventors: Steffen Stauber, Vogt (DE); Bruno Riedter, Weingarten (DE)

(73) Assignee: BLUM-NOVOTEST GMBH, Gruenkraut (DE)

( * ) Notice: Subject to any disclaimer, the term of this patent is extended or adjusted under 35 U.S.C. 154(b) by 682 days.

(21) Appl. No.: 17/269,904

(22) PCT Filed: Aug. 19, 2019

(86) PCT No.: PCT/EP2019/072156
§ 371 (c)(1),
(2) Date: Feb. 19, 2021

(87) PCT Pub. No.: WO2020/038894
PCT Pub. Date: Feb. 27, 2020

(65) Prior Publication Data
US 2021/0323109 A1    Oct. 21, 2021

(30) Foreign Application Priority Data
Aug. 22, 2018 (DE) ........................ 102018006653.4

(51) Int. Cl.
*G05B 19/4065* (2006.01)
*B23Q 17/24* (2006.01)
(Continued)

(52) U.S. Cl.
CPC ..... *B23Q 17/2485* (2013.01); *G05B 19/4065* (2013.01); *B23Q 17/00* (2013.01);
(Continued)

(58) Field of Classification Search
CPC .... B23Q 17/2485; B23Q 17/00; B23Q 17/22; B23Q 17/24; B23Q 17/2461;
(Continued)

(56) References Cited

U.S. PATENT DOCUMENTS

| 6,496,273 B1 * | 12/2002 | Stimpson | ........... B23Q 17/2485 356/621 |
| 2002/0118372 A1 * | 8/2002 | Bucher | .............. B23Q 17/2485 356/613 |

(Continued)

FOREIGN PATENT DOCUMENTS

| DE | 19950331 A1 | 5/2001 | | |
| DE | 10140822 A1 | 3/2003 | | |
| DE | 102005043659 A1 * | 3/2007 | ......... | B23Q 17/2466 |
| DE | 102005043659 A1 | 3/2007 | | |
| DE | 102013011307 A1 * | 1/2015 | ......... | B23Q 17/2466 |
| DE | 102013011307 A1 | 1/2015 | | |
| WO | 0128737 A1 | 4/2001 | | |
| WO | 2004056528 A1 | 7/2004 | | |

*Primary Examiner* — Michelle M Iacoletti
*Assistant Examiner* — Judy Dao Tran
(74) *Attorney, Agent, or Firm* — TAROLLI, SUNDHEIM, COVELL & TUMMINO L.L.P.

(57) ABSTRACT

A method for checking a tool uses a device with a light emitter for beam emission for tool scanning and with a beam receiver for beam reception and for outputting a shadow signal; and an evaluation unit for processing the shadow signal; rotation of the tool; moving the tool until it reaches a starting position in which the blade dips into the beam and shades this such that a threshold of a range of the evaluation unit is reached or undershot; moving the tool, starting from the starting position, out of the beam and registering the shadow signal; ascertaining that the shadow signal for a cutting edge does not fall below the lower switching threshold or exceed the upper switching threshold such that a shadow signal lies above the lower and below the upper switching threshold; wherein the feed is determined in proportion to a measurement range.

16 Claims, 5 Drawing Sheets

Fig. 1a %

(51) Int. Cl.
  *B23Q 17/00*   (2006.01)
  *B23Q 17/22*   (2006.01)
  *G01B 11/02*   (2006.01)
  *G01B 11/08*   (2006.01)
  *G01B 11/24*   (2006.01)
  *G05B 19/18*   (2006.01)

(52) U.S. Cl.
  CPC .............. *B23Q 17/22* (2013.01); *B23Q 17/24* (2013.01); *G01B 11/02* (2013.01); *G01B 11/08* (2013.01); *G01B 11/2433* (2013.01); *G05B 19/18* (2013.01); *G05B 2219/37415* (2013.01)

(58) Field of Classification Search
  CPC ................. B23Q 17/2466; G05B 19/4065; G05B 19/18; G05B 2219/37415; G05B 19/401; G05B 19/402; G05B 19/404; G01B 11/02; G01B 11/08; G01B 11/2433
  See application file for complete search history.

(56) References Cited

U.S. PATENT DOCUMENTS

| | | | |
|---|---|---|---|
| 2018/0088554 A1* | 3/2018 | Suzuki | ............... G05B 19/404 |
| 2018/0143612 A1* | 5/2018 | Watanabe | ............ G05B 19/402 |

* cited by examiner

TOOL-CHECKING DEVICE IN A WORKPIECE PROCESSING MACHINE

RELATED APPLICATIONS

The present invention is a U.S. National Stage under 35 USC 371 patent application, claiming priority to Serial No. PCT/EP2019/072156, filed on 19 Aug. 2019; which claims priority of DE 10 2018 006 653.4, filed on 22 Aug. 2018, the entirety of both of which are incorporated herein by reference.

BACKGROUND

A method and a device for checking/measuring a tool are described here. Details of this are defined in the claims; however, the description and the drawing also contain relevant information regarding the structure and mode of operation as well as regarding variants of the method and regarding the device components.

To realize the device aspects and to implement the method aspects, the tool can be taken up in a workpiece processing machine for its rotation and movement relative to a workpiece. The workpiece processing machine can be a (numerically controlled) machine tool (NC machine), a (multi-axis) machining center, a (multi-axis) milling machine or similar. The term machine tool is also used below for all of these machines or machines of this kind. Such a machine has a spindle on which a tool or a workpiece is mounted. The spindle can be positioned fixedly or moved in three orthogonal directions X, Y, Z within a work space of the machine, for example, and driven to rotate about these axes.

Before they are first used in a machining process, tools inserted into a tool magazine of the machine tool must be measured precisely in length and radius as well as other relevant parameters. The tool data ascertained at spindle speed is entered here automatically into the tool table of the NC controller under a specific tool number. The tool data is then known at each deployment of this tool and is available for machining.

The tool can be moved by the machine tool into a measuring space, an area defined for measurement, of a measuring beam. The measuring beam detects the proximity of the surface, for example using a capacitive, inductive or optical device. Pertinent measuring data is produced by means of the measuring beam and is forwarded to a controller, which can contain a computer program. From the positional information of the machine tool and the measuring data of the measuring device, the (numerical) controller can determine the precise dimensions of the tool.

Prior Art

A method and a device are known from DE 101 40 822 A1 for determining the position of rotation-driven tools, using the moment at which the tool to be measured and a measuring beam separate from one another. To this end the tool is positioned in the measuring beam such that its beam path is interrupted, thus the tool at least partially shades the measuring beam. An interruption of the measuring beam is present when the measuring beam is completely blocked by the tool or a quantity of light is let through that falls below a predetermined limit value. The limit value is defined depending on the minimum quantity of light that is required to output a signal by means of a receiver used for the measuring beam, which signal indicates the receipt of the measuring beam. An interruption may be present when partial shading of the measuring beam by the tool results in a quantity of light being let through that is 50% of the quantity of light emitted.

To determine the starting position, the known, approximate dimensions of the tool to be measured are used, or the tool is moved by activation of single or multiple axes of the machine tool in the manner of a search movement until the tool is located in the measuring beam. During this or thereafter, the tool is rotated. The tool is then moved relative to the measuring beam at a selected speed, which is as constant as possible, in the direction away from the beam. The tool is thereby moved to a measuring position in which the measuring beam is no longer interrupted by the tool, i.e., the tool is separated from the measuring beam. The moment of separation is reached when the interruption of the measuring beam by the tool results in shading at which the quantity of light let through is sufficient to trigger a signal of the receiver. The measuring position is registered, for example using axis positions determined by a controller of a machine tool and used to determine a position for the tool. The measuring position is registered when the measuring beam is not interrupted for at least one revolution of the tool.

DE 10 2013 011 307 A1 relates to a method for measuring a tool taken up in a machine tool with at least one cutting edge or edge, with the steps: provision of a measuring device with a laser emitter and a laser beam receiver for contactless scanning of a tool by means of a measuring beam transmitted by the laser emitter to the laser beam receiver, wherein the laser beam receiver emits a signal representative of a measure of shading of the measuring beam during scanning of the tool by means of the measuring beam; provision of an evaluation unit for receiving and processing the at least one signal, in order to process this signal and emit an output signal; introduction of the tool into the measuring beam such that at least one cutting edge or edge of the tool that is to be measured dips into the measuring beam and leaves it again while the tool is rotating; production of the output signal, which represents a result of a comparison of the at least one signal with the threshold value; changing the amount of a manipulated variable in the evaluation unit and/or the measuring device, in order to transform the signal or the threshold value; multiple repetition of the steps; rotation of the tool in the measuring beam, production of the output signal, and changing the amount of a manipulated variable; evaluation of the degree of the manipulated variable at which the output signal assumes a characteristic magnitude.

This procedure shortens the measuring time of previously known methods in which the tool is normally moved relative to the measuring beam. When changing the tool into the spindle of the machine tool, a correction value is selected in the numerical controller. The tool length is read from the tool memory so that the tool can be positioned appropriately. Pushing or pulling measurement can then take place, also oriented and stationary. The result of measurement of the tool length is then compared with the data in the tool memory. If the tool length does not lie within the breakage tolerance, an error message is output.

DE 1 99 503 31 A1 relates to a method for testing a cutting-edge geometry of a rotary-driven tool with a measuring system, with the following steps: determining an area to be tested on the tool; rotation of the tool at a selected speed; emission of a measuring beam, which determines a measuring area; positioning of the tool so that an envelope surface of its area to be tested that arises due to rotation dips into the measuring area; and detection of signals that indicate interactions of the measuring beam with obstacles in its propagation path. Here target points in time are determined at which an area, corresponding to the area to be tested, of a reference tool with a target division dips into the measuring area. The measuring system is synchronized with the rotation of the tool. Detection is subsequently carried out during selected detection time intervals, which comprise the target points in time.

WO2004/056528A1 relates to a tool analysis device for use on a machine tool, with a light emitter and a light receiver, wherein the light receiver receives light from the light emitter and generates a signal indicating the quantity of light received. A converter serves to provide data containing a numerical representation of the signal produced by the receiver. This data is processed and an output signal is generated if the data conforms to a predetermined condition. The predetermined condition represents a series of deviations in the light from the light emitter that is received at the light receiver, wherein the minimal and/or maximal values substantially conform to a curve of an expected type.

These conventional methods take a relatively long time and are detrimental to the productivity of the machine tool.

Previous approaches do not permit any fast and precise measurement of all cutting-edge lengths of a tool in a single measuring process/a single measuring movement in a focused (laser) light beam of a contactless measuring system in order to assess the true running characteristics of the tool in the spindle. They are only able to determine the longest or shortest cutting edge of a tool over one switching point. Correction of the switching point is not possible. Here several measuring movements at successively reduced feed rates are necessary to determine the longest cutting-edge length. Additional measuring movements are necessary to determine the shortest cutting-edge length. The longest and the shortest cutting-edge length cannot be determined simultaneously in one measuring process/measuring movement. Measurement of all cutting-edge lengths of a tool with the aid of a laser measuring system in a single measuring process has not been possible hitherto.

For measurement accuracy in the µm range, the feed rate of the tool should be adjusted to the desired feed/speed ratio during the measuring movement. This increases the measuring time. To determine the cutting-edge lengths of the tool with an accuracy of <1 µm, for example, the feed/speed ratio should be set to <1 µm per revolution of the tool. In other words, the feed movement for the cutting edges to be considered must not exceed 1 µm per revolution of the tool. At a spindle speed of S=3000 rpm the feed rate of the tool may not exceed F=3 mm/min, in order to guarantee the resolution A of 1 µm (A=F/S).

Disturbances due to coolants or swarf influence the accuracy of the measuring result. Previous measuring methods are not capable of filtering such disturbances reliably out of the measuring result or of eliminating them.

Basic Problem

The lengths of some or all cutting edges of a tool in a machine tool are to be determined by a single measuring process, preferably by means of a contactless (laser light) measuring system. It is preferable that at the end of the measuring process an absolute reference position or length exists that refers to the longest cutting edge. The method/arrangement presented here is intended to reduce the time required per measuring process with a high measuring accuracy.

Proposed Solution

The measurement range expansion presented here enables all cutting edges of a tool to be measured by expanding the usable analog measurement range of a measuring device for analog recording of the cutting-edge lengths during the measurement. A method used here for checking a tool with at least one cutting edge that is to be used in a machine tool has the following steps:

a) provision of a measuring device having
   a light emitter designed to emit a measuring beam for contactless scanning of the tool by means of the measuring beam, and
   a light beam receiver designed to receive the measuring beam and to output a shadow signal representative of a degree of shading of the measuring beam by the tool;

b) provision of an evaluation unit designed to receive and process the shadow signal from the light beam receiver;

c) rotation of the tool;

d) movement of the rotating tool relative to the measuring beam until the tool reaches a starting position in which the cutting edge or each cutting edge of the tool dips into the measuring beam and shades this such that a lower and an upper switching threshold of a measurement range of the evaluation unit is reached or undershot;

e) moving the tool, which is rotating at a predetermined speed, at an at least approximately constant feed rate, starting from this starting position, out of the measuring beam, or from a starting position above the upper switching threshold, into the measuring beam until the shortest cutting edge falls below the lower threshold, and f) registering the shadow signal produced by the cutting edge or each cutting edge of the tool during shading of the measuring beam with regard to its local and temporal occurrence during movement of the rotating tool out of the measuring beam;

g) ascertaining the event that, at least for one cutting edge of the tool, the shadow signal does not fall below the lower switching threshold of the measurement range and does not exceed the upper switching threshold of the measurement range, so that a maximum shadow signal produced during the movement of the rotating tool out of the measuring beam is located above the lower and below the upper switching threshold of the measurement range; wherein the feed rate is determined in proportion to a measurement range, which depends on a beam transverse measurement of the measuring beam, such that at least one of the cutting edges produces a maximum shadow signal located above the lower and below the upper switching threshold of the measurement range at different positions during at least one revolution of the rotating tool;

the maximum shadow signals determined of each cutting edge during each revolution of the rotating tool differ according to the delay and spatial change of the tool by an at least approximately constant offset amount, and are superimposed to form a resultant representative shadow signal for this cutting edge.

Advantages, Variants, Properties

To record a degree of shadow of individual cutting edges of the tool in a (laser) light beam or measuring beam, the usable analog measurement range is determined and limited by the focus diameter of the measuring beam in the method presented here. For precise, high-resolution measurements [µm/digit], a small diameter of the measuring beam is advantageous. Analog recording of cutting edges of different length in a bundled or coherent measuring beam with a small diameter at a fixed measuring position was hitherto considered disadvantageous, as the usable measurement range is restricted. In the case of large differences in the cutting-edge lengths, the attempt to register all cutting-edge lengths by analog recording at a fixed measuring position does not deliver a complete result in most cases on account of the restricted analog measurement range. In this constellation with widely varying cutting-edge lengths and a restricted measurement range, in the case of a fixed measuring position either only the maximum shadow signals of the shorter cutting edges are visible in the analog measurement range or the maximum shadow signals of the longer cutting edges, but rarely all cutting edges at the same time in the measurement range observed at the fixed measuring position. In order to bring the result determined in the evaluation unit of an analog recording with movement to a reference in the machine coordinate system, a reference measurement with switching point is therefore useful.

In the method presented here, such output signals produced with regard to a cutting edge or edge of a tool (or a workpiece) can then be evaluated directly in the evaluation unit or in a downstream control unit. This happens in one variant with the steps: production of a switching point from the resultant representative shadow signals and outputting of the switching point to a machine controller of the machine tool.

In the method presented here, the combination of analog data recording and generation of a switching point for the measurement of tools also permits the calculation of any measuring inaccuracy that may occur due to the feed/speed ratio in the switching point. Due to knowledge of the measuring inaccuracy and signaling of this to the NC controller of the machine tool, the precision of the measurement can be brought to the desired level.

The switching point that is output in the method presented here can be optimized by means of a comparison of the time of the switching point output and the calculated length of the cutting edge by means of processing steps and further evaluations. Any error due to the feed/speed ratio can likewise be documented and compensated for here.

This method presented here shortens the long measuring time of previously known methods in which the tool is moved relative to the measuring beam. The method presented here has the advantage that the relatively slow movement of the tool relative to the laser beam can be executed substantially faster by the steps presented here without any loss of measuring accuracy.

The different lengths of the cutting edges of the tool are detected in a measuring process. To this end the rotating tool is initially positioned in the measuring beam so that all cutting edges are fully immersed in the light beam and shade/interrupt this completely. In this position of the tool, the available analog measurement range is permanently or periodically undershot in the lower voltage range. Starting from this starting position, the tool—rotating at the same or another speed S—is moved at a constant feed rate v out of the light beam. This speed Sand the constant feed rate v are signaled to the measuring device, and if applicable—if known in the controller—also the number of cutting edges K of the tool.

From the known speed S [rpm] and the time constant T=1/S [min] resulting from this for a revolution of the tool, as well as the constant feed rate v [mm/min] of the tool, the shadow signal produced on immersion of the cutting edges of the tool can be registered and assigned precisely locally and timewise in the measuring device or a downstream controller. Due to the continuous movement of the tool at the constant feed rate v out of the measuring beam, the position of the individual cutting-edge lengths changes relative to the analog measurement range in the time interval of a time constant T after each complete revolution of the tool. The connection between the change in position deltaS of the cutting edge in the analog measurement range and a complete revolution of the tool is described by the relationship deltaS=v*T [µm].

As long as all cutting edges of the tool still fall fully below the analog measurement range, no precise (position/length) determination of the cutting edges is yet possible.

Only when a cutting edge no longer falls fully below the analog measurement range, thus when the maximum shadow signal produced is located with the analog measurement range, is a precise (position/length) determination of the cutting edges possible.

A maximum shadow signal here is understood to be the area of the shadow signal produced when the tip or outer edge of a tool dips furthest into the measuring beam.

The temporal and local recording with evaluation of the shadow signals therefore only commences when the first (shortest) cutting edge no longer falls below a lower threshold value in the analog measurement range (time t0=0 [µs, min]).

The feed rate v [mm/min] is selected in proportion to the available analog measurement range (transverse dimension D of the measuring beam in the direction of movement of the tool (for a circularly focused measuring beam that is its diameter) minus a lower and an upper limit range) such that each cutting edge shades the measuring beam over at least one or more revolutions N (for example, N=1–16, preferably N=8 revolutions) at offset positions in the analog measurement range. The maximum shadow signals of this cutting edge that are determined per revolution differ in the method presented here according to the delay and spatial change of the tool by a constant position change deltaS=v*T[µm] at a constant feed rate v.

In the method presented here, the maximum shadow signals determined for fractions or multiples of incomplete revolutions differ according to the delay and spatial change of the tool by a time-dependent relative position change deltaS(t)=v*(tk−t0)=v*t=v*N*T [µm] at a constant feed rate v, wherein t0=0 [µs, min] identifies the time of the start of recording with evaluation, tk>t0 [µs, min] is the time to be observed of a maximum shadow signal of a cutting edge K, t [µs, min] is the period of time that has elapsed since time t0, N [minus unit] is the number of complete and/or fractions of revolutions since the start of recording with evaluation at time t0=0 [µs, min], T=1/speed [rpm] of the tool, and v [mm/min] is the feed rate of the tool. In the case of incomplete revolutions, the value N can also assume, instead of a positive integer value (N=0, 1, 2, 3, . . . ), a positive value from the range of rational numbers (N=(tk−t0)/T with N>=0). Thus, the measured values of any point in time tk [µs, min] or any revolution N can be set in relation to one another and superimposed to form a resultant representative measured value for this/each cutting edge.

In the method presented here, all cutting edges of the tool pass through the analog measurement range of the measuring beam over at least one or more revolutions. The resultant representative measured values of the other cutting edges can be determined in relation to the longest cutting edge and to one another. In other words, the relative distance of each cutting edge from its following cutting edge can be determined by the constant offset amount (calculated, determined graphically) and can be compared and checked against the actual measured values of the other cutting edges.

When the last (longest) cutting edge of the tool reaches an upper threshold value in the analog measurement range, the temporal and local recording of the shadow signals is terminated with the output of a switching signal to the machine controller for the reference measurement. This switching point position serves as a reference for calculating the absolute length of the last (longest) cutting edge. Since the resultant representative measured values of the shorter cutting edges are likewise determined in relation to the last (longest) cutting edge, even each of these cutting-edge lengths can be determined absolutely and not only relatively.

In the method presented here, all cutting edges of the tool pass through the analog measurement range of the measuring beam over at least one or more revolutions. Production of the switching point from the resultant representative shadow signals and outputting of the switching point to the machine controller of the machine tool take place when the last (longest) cutting edge has exceeded/left the upper switching threshold of the measurement range. The time of outputting of the switching point is saved in the machine controller of the machine tool or in the measuring device so as to be available for any later switching point correction.

Figure 5:
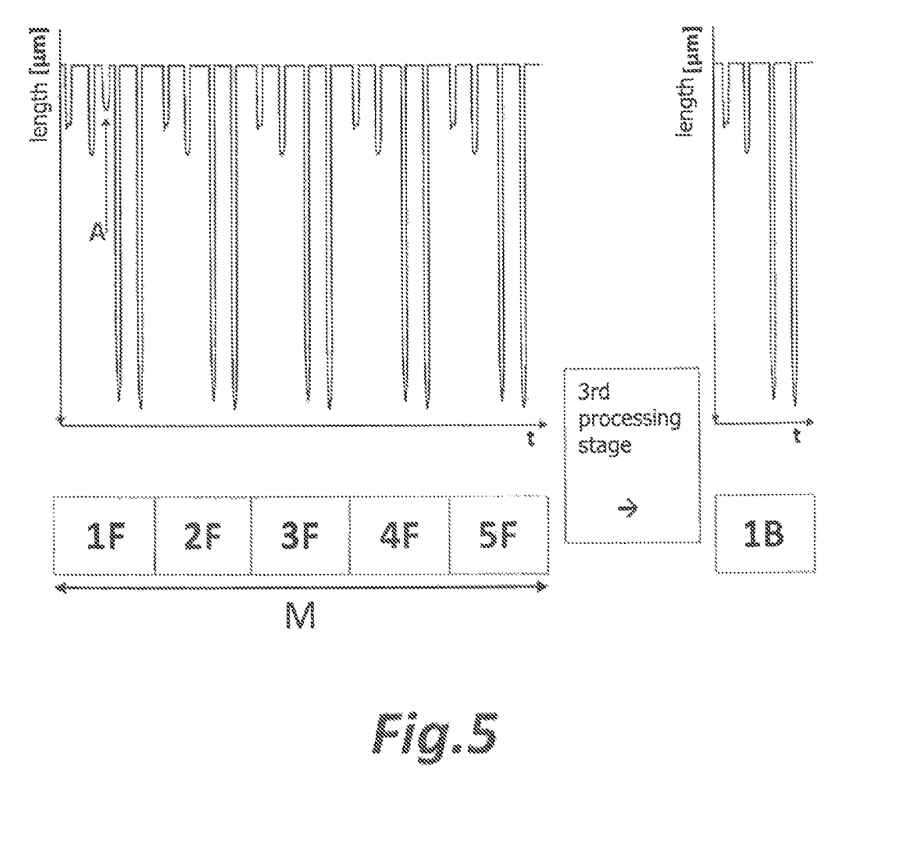

At each point in time at which the maximum shading of the measuring beam is recognized for a cutting edge, a clock starts in the evaluation unit or in a processor downstream of the measuring device with a waiting time $E\ [\mu s]=1.1*10^{6}*60\ [s/min]/S\ [1/min]$ i.e., $E\ [\mu s]=1.1*T\ [\mu s]$, which corresponds to the next maximum shading by the same cutting edge after another complete revolution. Here E is dependent on S, the speed of the tool per minute or the time T calculated therefrom for a complete revolution. This clock is reset and started (triggered) anew as long as another or the same cutting edge causes shading of the measuring beam. When the clock runs down, or more precisely when the maximum shadow signals of all cutting edges of the tool in the measuring beam are above the upper switching threshold and thus no further shading of the measuring beam was registered, the switching point is output. The time period between the last restart of the clock and the output of the switching point corresponds to the waiting time E, which is indicated in FIG. 5 as the timespan $t_{Kontroll}$.

In a variant of the method presented here, information present in the shadow signal and acquired during the movement of the tool in the measuring beam is masked out. In one of the variants, a first processing stage is used to eliminate a class of non-relevant information in the shadow signal. This class of non-relevant information in the shadow signal has its lowest point not between the upper and the lower switching threshold of the measurement range. Such information is eliminated, filtered out of the shadow signal. The length of a cutting edge can only be determined if the lowest point, the tip of the cutting edge, is visible within the measuring beam.

In another variant of the method presented here, an output signal (train), containing shadow signals from M revolutions of the tool, is formed in a second processing step from an input signal (train) containing shadow signals from U revolutions, wherein U>=M applies. In one variant, for each value in the output signal (train), several temporally corresponding values of the input signal (train) are combined to form one value. An output signal of the length M revolutions of the tool is thus formed from an input signal of the length U revolutions. For each value in the output signal of the processing stage, one or more values, for example three or four values, are available, which were recorded at different points in time and at different positions of the tool. These values are combined into one value in the second processing stage to this end. Data with relevant information is linearized in one variant and converted from scale values to µm values. The spatial change is also taken into account for each relevant measured value with the aid of the temporal position change deltaS.

In another variant of the method presented here, singular disturbances are eliminated from the sequence of shadow signals of each cutting edge in a third processing stage. In this way only recurring events, thus the regular shading of the measuring beam by the cutting edges, are used for evaluation. By means of the third processing stage these recurring events can be distinguished from single events, such as coolant drops adhering to the tool or a milling chip, for example, and can be output for further processing.

To this end, the shadow signals are examined for recurring events in one variant in order to recognize their periodicity. Then sequences of shadow signals corresponding to a revolution of the tool are combined into signal blocks and superimposed with the sequences of shadow signals of one or more following revolutions of the tool. From this, the individual signal values in the sequences of shadow signals are compared with one another for each scanning point in time, the respective minimum is selected, wherein the mathematical manner for the selection of the value for a scanning time can differ and can also be realized by maximum, mean value, median or similar methods, and output as an output value of the third processing stage. A disturbance in the form of a coolant drop, for example, is thus masked out, as only events recurring in all signal blocks, which therefore occur in all signal blocks, are added to the output values.

By applying these processing stages, a measuring signal that is picked up during the movement of the tool in a small measurement range, the focused measuring beam, is widened into a greater measurement range. The length of the individual cutting edges is calculated taking account of the last (longest) cutting edge as a reference, with the relative length=0, and the consideration of the differences of the other cutting edges from this.

Due to the feed/speed ratio, the switching point that is output to the machine controller has an error and does not correspond to the measurement for the length of the last (longest) cutting edge. In this method this error is corrected with the aid of the calculated lengths and the time at which the switching point was triggered.

The aforementioned time error on output of the switching point due to the feed/speed ratio arises due to the difference between the upper switching threshold and the immersion depth/length of the cutting edge triggering the switching point at the last trigger time. Here the length of each cutting edge is calculated, thus also the length of the cutting edge for which the switching point is output to the machine controller. If a length is calculated for the time of the switching point output and this value is compared with the cutting edge for which this switching point was output, the error is obtained through the feed/speed ratio, and the deviations known in the measuring device through the output of the switching point delayed by the waiting time E and the known offset between the calibrated switching point threshold, for example at 50% light intensity at the light beam receiver, and the upper switching point threshold used in this method, for example at 90% light intensity at the light beam receiver. This error is communicated to the machine controller as a correction value.

The (laser) measuring device and the machine controller of the machine tool communicate in the method presented here wirelessly or via a data line, for example PROFIBUS, to exchange necessary information and signals. The machine controller of the machine tool signals parameters relevant for the measurement, such as speed and feed rate of the tool and if applicable also the number of cutting edges of the tool to the measuring device. The measuring device signals results determined by it to the machine controller.

Due to analog scanning and recording of the shadow signal for each cutting edge while this moves at a constant speed and constant feed rate through the measuring beam, the usable measurement range for the analog recording of the lengths of the cutting edges is expanded in the method presented here. In contrast to previous measurements with switching point, in which the accuracy is specified by the feed/speed ratio, so that for precise measurements the feed rate has to be reduced, due to which the duration of measurement increases, in the method presented here the result of an analog recording is related to the machine coordinate system in that a switching point is generated from the analog data recording during the measurement of tools.

Due to the substantially shorter duration of the individual measurements, a plurality of measurements can thus be carried out in the same time with the method presented here. This also increases accuracy as well as measurement reliability.

Using the method presented here, measurement under harsh ambient conditions is also possible. Repeated measurements such as were necessary in the case of conventional methods are no longer necessary using the method presented here. Singular disruptive influences, for example due to drops or chippings, can be reliably masked out by the method presented here. Such disruptive influences, which have caused an incorrect measurement in conventional methods, do not result in a disturbance using the method presented here. With the method presented here, fewer measuring movements and positionings of the tool relative to the measuring beam are to be executed by the machine controller. Shorter measurement times can therefore be achieved. The possibility also exists with the method presented here of correcting a switching point that is output to the machine controller. Overall a reliable determination of the length/position of all cutting edges of a tool can be achieved with the method presented here in the execution of just one measurement.

In another aspect, a device for checking a tool to be used in a numerically controlled machine tool is provided here. This device is equipped with a measuring device having a light emitter, which is designed to emit a measuring beam for contactless scanning of the tool by means of the measuring beam, and a light beam receiver designed to receive the measuring beam and to output a shadow signal representative of a degree of shading of the measuring beam by the tool; as well as an evaluation unit, which is programmed and designed to receive and process the shadow signal from the light beam receiver; receiving and processing of a signal from a controller of the machine tool about the rotation of the tool and movement of the rotating tool relative to the measuring beam; initiation of a message to the controller of the machine tool that the tool is reaching a starting position in which the cutting edge or each cutting edge of the tool dips so far into the measuring beam and in doing so shades this to such an extent that a lower and an upper switching threshold of a measurement range of the evaluation unit is attained or undershot; initiation of a movement of the tool rotating at a predetermined speed at an at least approximately constant feed rate, starting out from this starting position, out of the measuring beam, and registration of the shadow signal produced by the cutting edge or each cutting edge of the tool during shading of the measuring beam in relation to its local and temporal occurrence during the movement of the rotating tool out of the measuring beam; determination of the event that, at least for one cutting edge of the tool, the shadow signal does not fall below the lower switching threshold of the measurement range and does not exceed the upper switching threshold of the measurement range, so that a maximum shadow signal produced during the movement of the rotating tool out of the measuring beam is located above the lower and below the upper switching threshold of the measurement range; wherein the feed rate in proportion to the measurement range of the evaluation unit, which range is dependent on a beam transverse measurement of the measuring beam, is determined such that, during a number of revolutions of the rotating tool sufficient for an evaluation, at least one of the cutting edges produces at different positions a respective maximum shadow signal located above the lower and below the upper switching threshold of the measurement range; with each revolution of the rotating tool the maximum shadow signals ascertained of each cutting edge differ by an at least approximately constant offset amount according to the delay and spatial change of the tool, and are superimposed to form a resultant representative shadow signal for this cutting edge.

In one or more variants, the controller in this device is programmed and designed to carry out one or more of the aforementioned method steps.

Let it be understood that all three processing stages and the respective data processing carried out there, or also only two or one of the processing stages, can be used to improve the quality of the checking/measurement.

BRIEF DESCRIPTION OF THE DRAWING

Other details, features, objectives, advantages, application possibilities and effects of the method and devices described here result from the following description of currently preferred variants and the associated drawings. Here all features and steps described and/or depicted form by themselves or in any combination the subject matter disclosed here, even independently of their grouping in the claims or their references.

DETAILED DESCRIPTION OF THE DRAWING

Figure 1:
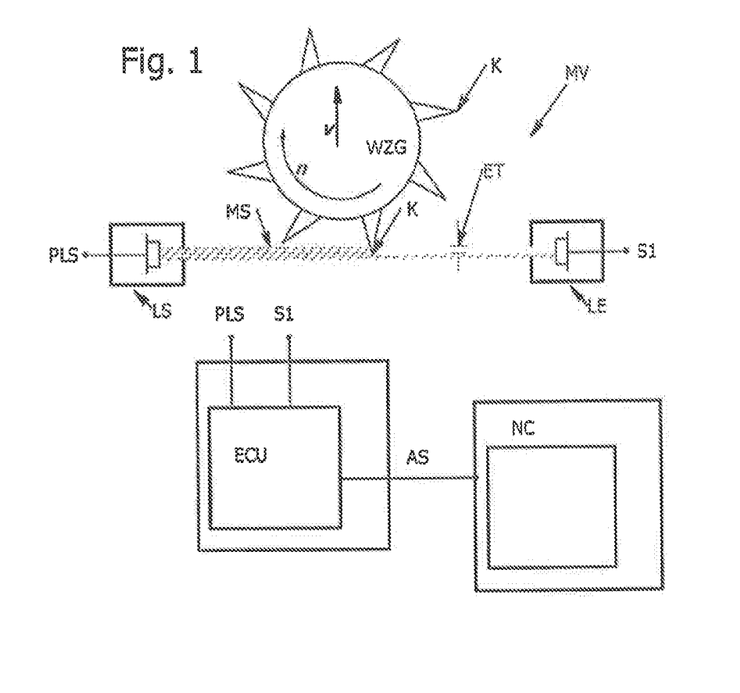
FIG. 1 shows in a schematic depiction a variant of a measuring situation with the solution described here in a numerically controlled machine tool.

FIG. 1 depicts schematically a device for measuring a tool WZG with at least one cutting edge or edge K, which tool is taken up in a workpiece processing machine. This device has a measuring device MV with a laser emitter LS, which is designed to emit a measuring beam MS, and a laser beam receiver LE that is aligned precisely to the laser emitter LS. The laser emitter LS is designed to transmit the measuring beam MS to the laser beam receiver LE for contactless scanning of the tool WZG when a corresponding control signal for controlling the laser output PLS is present at the laser emitter LS. The laser beam receiver LE is designed to output a signal S1 that is representative of a degree of shading of the measuring beam MS during scanning of the tool WZG by the measuring beam MS. This representative signal S1 has a continuous value range WB with an upper limit OG and a lower limit UG. For reliable evaluatability of the representative signal S1 in the control and evaluation unit ECU, the value range used is limited by an upper and lower switching threshold OSS and USS.

Figure 1A:
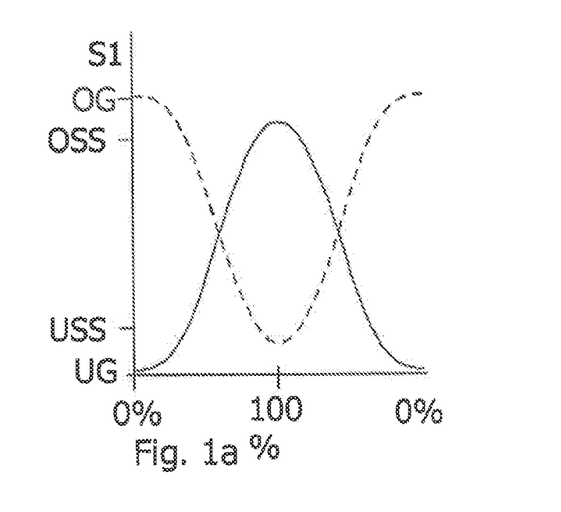
FIGS. 1a, 2-7 show diagrams of recorded and processed signal characteristics.

The latter is also illustrated in the diagram in FIG. 1a, in which the representative signal S1 is entered on the ordinate and a measurement for the dipping of the edge K of the tool WZG into the measuring beam MS (immersion depth ET) is entered on the abscissa. In the curve shown here of the representative signal S1 over the immersion depth ET, the beam is a bundled measuring beam MS with a circular cross section.

The control and evaluation unit ECU of the device is designed to receive and process the representative signal S1. The evaluation unit ECU processes this representative signal S1 and outputs an output signal AS. This output signal AS comprises just one switching point in one variant; in another variant, this output signal AS also comprises a correction value. Furthermore, the output signal AS can also comprise instructions to move and/or rotate the tool. Both the details of the switching point and the details of the correction value as well as regarding the instructions for moving and/or rotating the tool are explained in detail below.

When the tool WZG rotates and its cutting edges/edges K are moved into or out of the measuring beam MS before/simultaneously or thereafter, this has the result that at least one cutting edge or edge K of the tool WZG dips into the measuring beam MS and exits this again. The amount of light from the measuring beam MS arriving at the laser beam receiver LE is modulated in this way.

Following processing of the representative signal S1, the control and evaluation unit ECU of the device thus delivers an output signal AS to a numerical controller NC of the machine tool.

With this configuration a method is to be executed for checking or measuring the tool to be used in the numerically controlled machine tool.

FIG. 1 illustrates the positioning of the WZG in the starting position. For this, a positioning record or measuring record is started in the numerical controller NC of the machine tool, which record causes rotation of the tool WZG and movement of the rotating tool WZG relative to the measuring beam MS until the tool reaches a starting position in which the cutting edge or each cutting edge of the tool dips so far into the measuring beam and in doing so shades this to such an extent that a lower and an upper switching threshold of a measurement range of the evaluation unit is reached or undershot.

Figure 2:
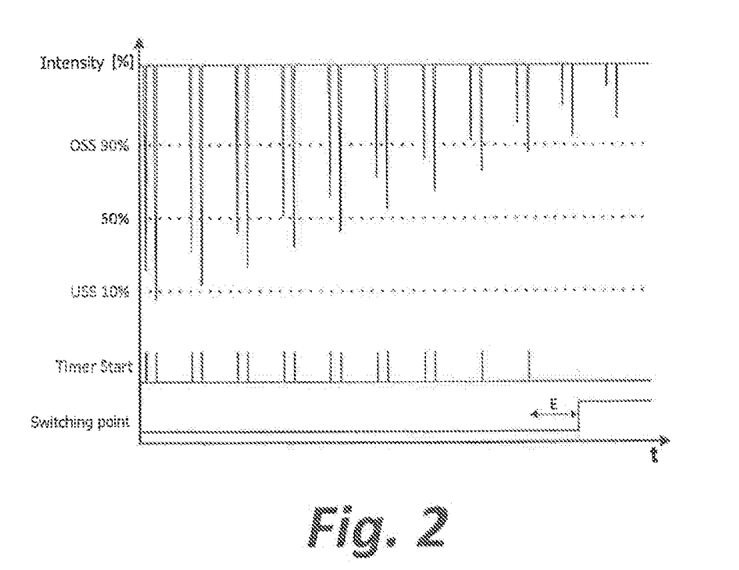

FIG. 2 explains the switching point output on the basis of a signal curve of the shading of the measuring beam by the cutting edges of a rotating tool WZG. The signal curve can be seen in the upper part of the diagram. The movement of the cutting edges K through the measuring beam MS is apparent from the scale values.

FIG. 2 illustrates how the movement of the cutting edges K through the measuring beam is recognizable from the scale value (ordinate). In this case the (upper) switching threshold OSS is not at 50%, as is normal in the prior art, but at a higher threshold value (for example, 90% light intensity at the light beam receiver). At each time of maximum shading of the measuring beam MS by a cutting edge K, which still takes place below the upper switching threshold OSS, a clock (timer) is started in the evaluation unit (ECU) with a waiting time E of the next maximum shading by the same cutting edge, wherein E is dependent on the speed n of the tool per minute. This clock in the evaluation unit ECU is reset and started anew each time another cutting edge K produces (maximum) shading of the measuring beam MS, which still takes place below the upper switching threshold OSS. If the waiting time E of the clock expires without the evaluation unit ECU registering shading of the measuring beam MS, a switching point is output to the numerical controller NC. The timespan between the last undershooting of the (upper) switching threshold and the output of the switching point corresponds to the waiting time E.

This movement of the rotating tool is executed by a measuring record in the numerical controller NC of the machine tool. The measuring record in the numerical controller NC of the machine tool causes a movement of the tool WZG, rotating at the predetermined speed n, at an at least approximately constant feed rate v, starting from the starting position, out of the measuring beam MS. Signaling of the speed n of the rotating tool and the constant feed rate v by the machine controller of the machine tool to the measuring device MV also takes place.

During the movement of the rotating tool WZG, recording takes place of the shadow signal produced by the or each cutting edge K of the tool WZG during shading of the measuring beam MS in relation to its local and temporal occurrence during the movement of the rotating tool WZG out of the measuring beam MS.

Determination takes place in the evaluation unit ECU of the event that at least for one cutting edge K of the tool WZG, the shadow signal does not fall below the lower switching threshold USS of the measurement range and does not exceed the upper switching threshold OSS of the measurement range, so that a maximum shadow signal produced during movement of the rotating tool WZG out of the measuring beam MS is located above the lower switching threshold USS and below the upper switching threshold OSS of the measurement range.

Temporal and local recording with evaluation of the shadow signals by the measuring device commences when the shortest cutting edge of the tool WZG no longer falls below a lower switching threshold USS in the analog measurement range. This event defines a time $t0=0$ µs, at which the first relevant information for the start of evaluation is found.

To improve the signal quality and the outputted data/the accuracy of the outputted switching point, information that has its lowest point not between the upper and the lower switching threshold of the measurement range is eliminated in a first processing stage in the shadow signal.

Figure 3:
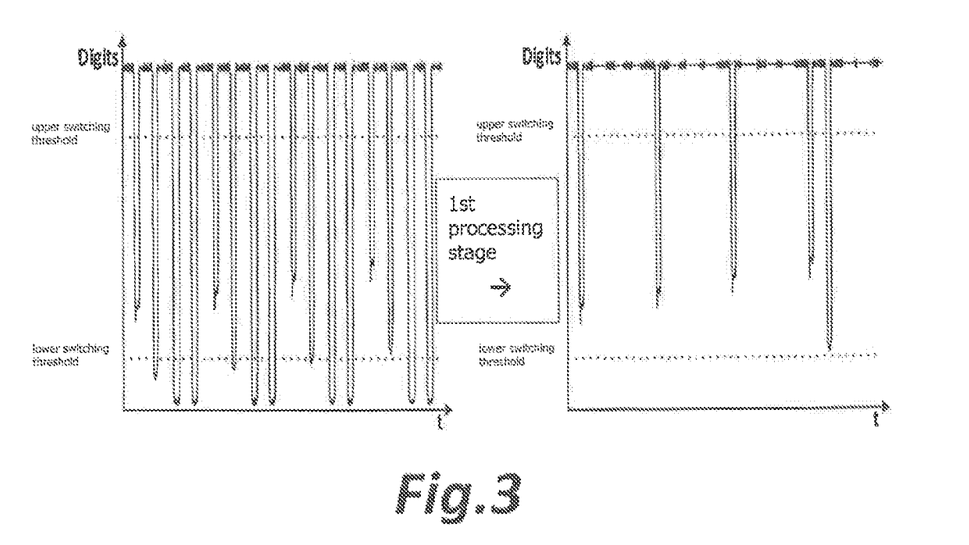

FIG. 3 shows here how signal portions that do not contain any evaluatable information are eliminated in the evaluation unit ECU. If the lowest point of the shadow signal is not within the range between the upper switching threshold OSS and lower switching threshold USS (FIG. 3 left), the shadow signal of the respective cutting edge K is eliminated (FIG. 3 right), in order to evaluate only the relevant information. The actual length of a cutting edge can only be determined if the lowest point, thus the tip of the cutting edge, is located between the upper switching threshold OSS and the lower switching threshold USS of the measuring beam.

Here the feed rate is determined by the evaluation unit in relation to the measurement range, which is dependent on a beam transverse measurement of the measuring beam, such that at least one of the cutting edges K produces, at different positions during a number of revolutions of the rotating tool WZG sufficient for evaluation, a maximum shadow signal located above the lower and below the upper switching threshold of the measurement range. In FIG. 3, for example, this is recognizable in the left-hand diagram for the first cutting edge of the tool WZG with four cutting edges, which also produces the $5^{th}$, $9^{th}$ and $13^{th}$ shadow signal, each offset upwards by a constant value. This offset results from the fact that on each revolution of the rotating tool, the maximum shadow signals determined of each cutting edge K differ according to the delay and spatial change of the tool by an at least approximately constant offset amount.

Put more accurately, the evaluation unit ECU determines the offset amount from a position change deltaS of the respective cutting edge K of the tool WZG in the analog measurement range in a complete revolution of the tool WZG as deltaS=v*T, wherein the time constant T=1/speed per minute [rpm] of the tool, and v [mm/min] is the constant feed rate of the tool.

In this case the feed rate v [mm/min] of the tool WZG is selected in proportion to the available analog measurement range such that each cutting edge K of the tool WZG shades the measuring beam MS at offset positions in the analog measurement range over at least one or more revolutions. For each revolution of the tool WZG, determined maximum shadow signals of this cutting edge K thus differ corresponding to the delay and spatial change of the tool WZG by the position change deltaS.

When all cutting edges K of the tool WZG pass through the analog measurement range between the lower switching threshold USS and the upper switching threshold OSS of the measuring beam MS over at least one or more revolutions, the relative distance of each cutting edge from the following cutting edge is determined in each case by the constant offset amount of the position change deltaS(K)=v*T/K, wherein K>=1 [minus unit] is the number of cutting edges of the tool WZG that are assumed to be symmetrically distributed/arranged.

It generally applies that the evaluation unit ECU determines the relative offset amount of the shadow signal of one/each cutting edge compared with the shadow signal of the first (shortest) cutting edge at an arbitrary time tk>t0 [μs, min] since the start of recording and evaluation of the shadow signals at time t0=0 [μs, min] from a position change deltaS(t) [μm]=v*(tk−t0)=v*t, with t=(tk−t0)=N*T [μs, min], wherein N=(tk−t0)/T>=0 [minus unit] describes the number of partially and/or fully executed revolutions since time t0, and the time constant T=1/speed per minute [rpm] of the tool. In this generally described relationship, knowledge of the precise number of cutting edges K is not necessary, only the period t=(tk−t0) that has elapsed since the time t0, and the time constant T [μs, min] for a revolution of the tool WZG and the constant feed rate v [mm/min] of the tool.

The time t=(tk−t0) can either be described by the number of partially and/or fully executed revolutions since the time t0 or as a multiple of the sample time ts[μs]=1/fs, wherein fs [μs$^{-1}$] is the scanning frequency for reading in the measured values Xi. The measured value X0 at time t0 is saved in a measured value memory with index i=0. For each new measured value Xi read in, the index i is incremented by a counter i=i+1 and the measured value is saved under the new index i in the measured value memory. Alternatively, the evaluation unit ECU determines the time t from the relationship t [μs]=i/fs, wherein i is the current measured value index for a measured value Xi and fs [μs$^{-1}$] is the sample rate (scanning frequency) for reading in the measured values Xi.

The evaluation unit ECU ends the temporal and local recording of the shadow signals by outputting the switching signal to the machine controller NC. In this case the switching point is produced from the resultant representative shadow signals and the switching point is output to the machine controller NC of the machine tool when the last cutting edge K has exceeded the upper switching threshold OSS of the measurement range. Here the time of the outputting of the switching point is also saved in the machine controller NC of the machine tool or in the evaluation unit ECU of the measuring device MV.

Figure 4:
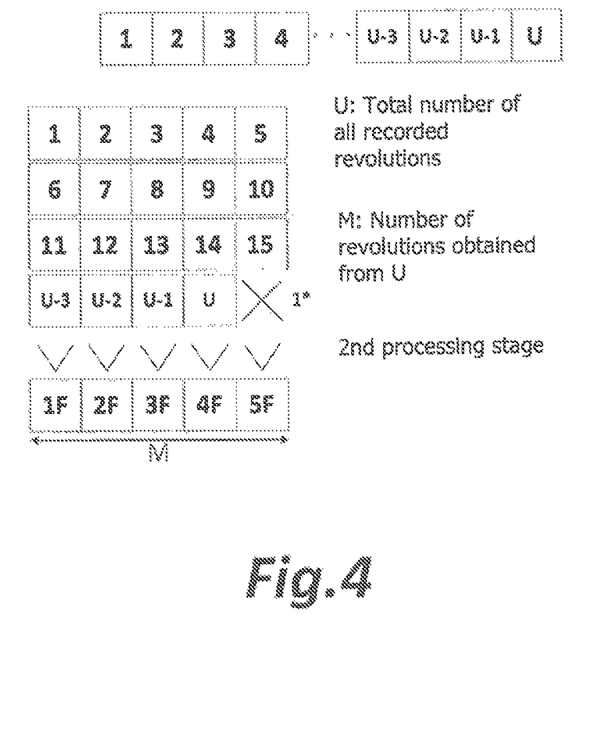

As shown in FIG. 4, in a further processing stage in the evaluation unit ECU, an output signal (train) containing shadow signals from M revolutions of the tool is formed from one input signal (train) containing shadow signals from U revolutions. Here U>=M. To this end, several values corresponding in time of the input signal (train) are combined into one value for each value in the output signal (train). Thus, an output signal of the length M revolutions of the tool is formed from one input signal of the length U revolutions. For each value in the output signal of this second processing stage, one or more values, for example three or four values, are available. These values are combined into one value in the second processing stage. Data with relevant information is linearized if applicable and converted from scale values to μm values.

The evaluation unit ECU carries out the conversion of scale values into μm values by means of a conversion polynomial as follows: S(x) [μm]=f(x[Digits]), wherein S(x) is the immersion depth of the tool cutting edge in the measuring beam for a certain scale value and the function/describes the polynomial for the conversion. Taking the time-dependent relative offset amount deltaS(t) [μm] into account, the corresponding immersion depth of the tool cutting edge S [μm] at a certain time t results from the sum S [μm]=S(x) [μm]+deltaS(t) [μm].

According to FIG. 4, the second processing stage combines information, for example, from the revolutions U=1, 6, 11 and U−3 to give a resultant revolution 1F. If no information or only one item of valid, unprocessed information is present for an index, the value in 1F is set accordingly. If several valid items of information are present, these are combined by suitable mathematical methods. Mean value formation or median formation can be used as a suitable method, for example, or also particularly defined evaluation algorithms. With the second processing stage these individual revolutions U of the tool WZG and the shadow signals occurring here due to the cutting edges K are combined into a signal sequence that synthesizes a single revolution (1F, 2F, 3F, . . . ) of the tool WZG. Since the individual revolutions U are recorded at a different time, the time offset must also be taken into consideration in connection with the indicated feed rate in the conversion into μm.

As illustrated in FIG. 5, a third processing stage causes singular disturbances to be eliminated from the sequence of shadow signals of each cutting edge in the output signal. Here the shadow signals are examined for recurring events in order to recognize the periodicity of the shadow signals. Based on the periodicity of the shadow signals, sequences of shadow signals corresponding to a revolution of the tool WZG are combined as signal blocks and correlated with the sequences of shadow signals of one or more following revolutions (1F, 2F, 3F, . . . ) of the tool WZG. Then the individual signal values in the sequences of shadow signals are compared with one another at each scanning time and the minimum picked out in each case, wherein the mathematical method for determining the representative value at this scanning point can also be realized by maximum, mean value, median or similar methods and this can be output as output value (1B) of the third processing stage.

As recognizable in FIG. 5, the third processing stage causes the elimination of single sporadic events during the recording of the shadow signals. In the example, a non-recurring event A is shown at the beginning in the signal.

This is filtered out by the third processing stage and not taken into account further for the subsequent evaluations.

Figure 6:
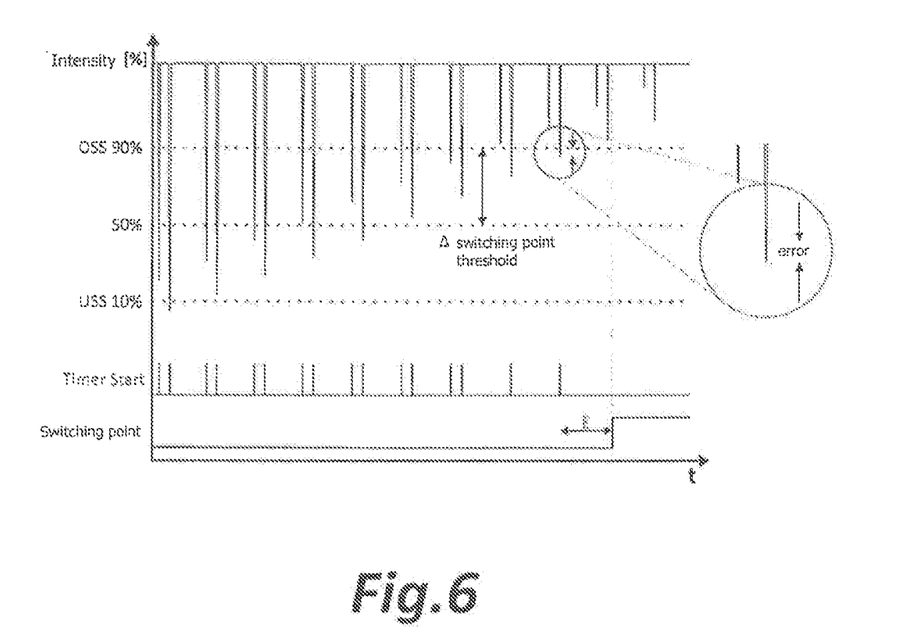

FIG. 6 explains how a time error in the output of the switching point is compensated for. For this the steps are used of calculating the length of each cutting edge, including the length of the cutting edge for which the switching point is output to the machine controller, comparison of a length calculated for the time of the switching point output with the length determined from the shadow of the cutting edge for which this switching point was output, and signaling the difference to the machine controller as a correction value. By means of this calculation the deviations known in the measuring device are also corrected by the output of the switching point delayed by the waiting time E and the offset between calibrated switching point threshold, for example at 50% light intensity at the light beam receiver, and the upper switching threshold used in this method, for example at 90% light intensity at the light beam receiver.

Figure 7:
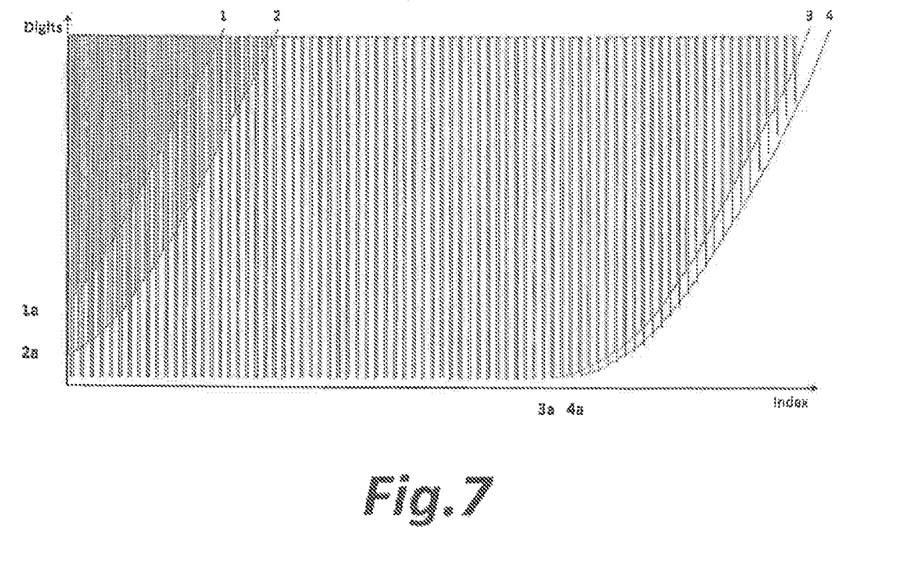

FIG. 7 shows a complete recording present for a measurement range expansion. In the signal, the curves of the individual cutting edges that are briefly visible in the analog measurement range for a certain time duration during the measurement are drawn in. Due to the movement of the tool WZG during the measurement, the edge K of a cutting edge is always located at a different position. The edge K of one/each cutting edge dips at point $1a \ldots 4a$ into the limited analog measurement range for the first time, passes through this measurement range during several revolutions due to the constant measuring speed and leaves the analog measurement range again at point $1 \ldots 4$. In the case of different lengths of the cutting edges, their edges are not all visible simultaneously in the analog measurement range. In the case of digits, the curve of the red lines drawn in is not a straight line, as it should be on account of the constant feed rate, as the values are first converted by means of linearization characteristics.

The shadow signals of each cutting edge K are then superimposed overall to form a resultant representative shadow signal for this/each cutting edge in the manner described above.

The measuring device MV and the machine controller NC of the machine tool exchange necessary information and signals wirelessly or via a data line. In this case the machine controller of the machine tool signals parameters relevant for the measurement, such as speed and feed rate of the tool, to the measuring device. The measuring device signals the results it ascertains to the machine controller of the machine tool.

The previously described variants of the method and the device serve only for a better understanding of the structure, mode of operation and properties of the solution presented; they do not restrict the disclosure to the exemplary embodiments, for instance. The figures are schematic, wherein substantial properties and effects are depicted significantly enlarged in part, in order to clarify the functions, active principles, technical configurations and features. Each mode of operation, each principle, each technical configuration and each feature that is/are disclosed in the figures or in the text can be freely combined in any way with all claims, each feature in the text and in the other figures, other modes of operation, principles, technical configurations and features that are contained in this disclosure or result from it, so that all conceivable combinations are to be associated with the solution described. Combinations between all individual implementations in the text, meaning in each section of the description, in the claims and even combinations between different variants in the text, in the claims and in the figures are also comprised in this case. Although the device and method details explained above are depicted in combination, let it be pointed out that they are also independent of one another and also freely combinable with one another. The relationships of the individual parts and sections thereof to one another that are shown in the figures and their dimensions and proportions should not be understood as restrictive. On the contrary, individual dimensions and proportions can also vary from those shown. Nor do the claims limit the disclosure and thus the combination possibilities of all features shown with one another. All disclosed features are explicitly disclosed here also individually and in combination with all other features.

The invention claimed is:

1. A method for checking a tool to be used in a numerically controlled machine tool, with the following steps:
a) provisioning a measuring device, having
   a light emitter designed to emit a measuring beam for contactless scanning of the tool by means of the measuring beam, and
   a light beam receiver designed to receive the measuring beam and to emit a shadow signal representative of a degree of shading of the measuring beam by the tool;
b) provisioning an evaluation unit designed to receive and process the shadow signal from the light beam receiver;
c) rotating the tool;
d) moving the rotating tool relative to the measuring beam until the tool reaches a starting position in which each cutting edge of the tool dips into the measuring beam so far, and in doing so shading this to such an extent, that a lower and an upper switching threshold of a measurement range of the evaluation unit is reached;
e) moving the tool, which is rotating at a predetermined speed, out of the measuring beam at an at least approximately constant feed rate, starting from said starting position, until a shortest cutting edge falls below the lower switching threshold, and
f) registering the shadow signal produced by each cutting edge of the tool during shading of the measuring beam in relation to a local and a temporal occurrence of the shadow signal during movement of the rotating tool out of the measuring beam;
g) determining an event that at least for one cutting edge of the tool, the shadow signal does not fall below the lower switching threshold of the measurement range and does not exceed the upper switching threshold of the measurement range, so that a maximum shadow signal produced during the movement of the rotating tool out of the measuring beam is located above the lower and below the upper switching threshold of the measurement range; wherein
   the feed rate is determined in proportion to said measurement range of the evaluation unit, which range is dependent on a beam transverse measurement of the measuring beam, such that at least one of the cutting edges produces a maximum shadow signal located above the lower and below the upper switching threshold of the measurement range at different positions during at least one revolution of the rotating tool;
   on each revolution of the rotating tool, the determined maximum shadow signals of each cutting edge differ according to a temporal delay of the tool and a spatial change of the tool by an at least approximately constant offset amount, and are superimposed to form a resultant representative shadow signal for said cutting edge.

2. The method according to claim 1, with the steps:
generating a switching point from the resultant representative shadow signals, and
outputting the switching point by the measuring device to a machine controller of the machine tool.

3. The method according to claim 1, with the steps:
signaling the speed of the rotating tool and the constant feed rate by a machine controller of the machine tool to the measuring device.

4. The method according to claim 1, with the steps:
determining a position change deltaS of the cutting edge of the tool in the measurement range on a complete revolution of the tool as deltaS=v*T, wherein T=1/speed [rpm] of the tool, and v [mm/min] is the constant feed rate of the tool.

5. The method according to claim 1, wherein temporal and local recording with evaluation of the shadow signals by the measuring device commences when the shortest cutting edge of the tool no longer falls below a lower switching threshold in the measurement range.

6. The method according to claim 1, wherein the feed rate v [mm/min] of the tool is selected in proportion to the measurement range such that each cutting edge of the tool shades the measuring beam over at least one revolution or more revolutions at offset positions in the measurement range so that the maximum shadow signals of this cutting edge determined per revolution differ according to the delay and spatial change of the tool by a position change deltaS=v*T, wherein T=1/speed [rpm] of the tool, and v [mm/min] is the feed rate of the tool, and wherein the shadow signals of each cutting edge are superimposed to form a resultant representative shadow signal for each cutting edge.

7. The method according to claim 1, wherein all cutting edges of the tool pass through the measurement range between the lower and the upper switching threshold of the measuring beam over at least one revolution or more revolutions, wherein the relative distance of each cutting edge from its following cutting edge is determined by the constant offset amount of a position change deltaS(K)=v*T/K, wherein K [minus unit] is the number of cutting edges of the tool arranged distributed preferably symmetrically on a circumference, T=1/speed [rpm] of the tool, and v [mm/min] is the feed rate of the tool.

8. The method according to claim 1, wherein all cutting edges of the tool pass through the measurement range between the lower and the upper switching threshold of the measuring beam during one revolution or more revolutions, wherein the relative distance of each cutting edge from the shortest cutting edge at an arbitrary point in time tk>t0 [μs, min] is determined by a relative offset amount of a position change deltaS(t)=v*(tk−t0)=v*t=v*N*T [μm], wherein t0=0 [μs, min] identifies the time of the start of recording with evaluation, tk [μs, min] is the time to be considered with a maximum shadow signal of a cutting edge K, t [μs, min] is the time that has elapsed since the time t0, N [minus unit] is the number of complete and/or fractions of revolutions since the start of recording with evaluation at time t0=0 [μs, min], T=1/speed [rpm] of the tool, and v [mm/min] is the feed rate of the tool.

9. The method according to claim 1, wherein the temporal and local recording of the shadow signals is ended with the output of a switching signal to a machine controller, and wherein the production of a switching point from the resultant representative shadow signals, and/or the outputting of the switching point to the machine controller of the machine tool takes place when a last cutting edge has exceeded the upper switching threshold of the measurement range, and/or the time of the outputting of the switching point is saved in the machine controller of the machine tool or in the measuring device.

10. The method according to claim 1, wherein at a time of maximum shading of the measuring beam by a cutting edge, a clock is started with a waiting time E [μs] of the next maximum shading by the same cutting edge, wherein E is dependent on the speed of the tool per minute, and/or this clock is reset and started anew as long as another cutting edge produces shading of the measuring beam, and when the clock runs down without shading of the measuring beam being registered, a switching point is output.

11. The method according to claim 1, wherein information in the shadow signal that does not have its lowest point between the upper and the lower switching threshold of the measurement range is eliminated.

12. The method according to claim 1, wherein an output signal, which comprises shadow signals from M revolutions of the tool, is formed from an input signal, which comprises shadow signals from U revolutions, wherein U>=M applies, and/or wherein in particular for each value in the output signal, one or more values from the input signal are combined to form one value.

13. The method according to claim 1, wherein in an output signal, singular disturbances are eliminated from a sequence of shadow signals of each cutting edge, wherein
the shadow signals are examined for recurring events to recognize their periodicity,
sequences of shadow signals corresponding to a revolution of the tool are combined as signal blocks and correlated with the sequences of shadow signals of one or more following revolutions of the tool,
at each scanning time individual signal values in the sequences of shadow signals are compared with one another, the minimum is selected in each case and this is output as an output value, wherein to determine a resultant representative value for this scanning time the maximum, mean value, median or similar is evaluated additionally or alternatively.

14. The method according to claim 1, wherein a time error in an output of a switching point is compensated for by
calculating the length of each cutting edge, including a length of the cutting edge for which the switching point was output to a machine controller,
comparing a length calculated for a time of the switching point output with the length, determined from the shading, of the cutting edge for which this switching point was output, and
signaling the difference to a machine controller as a correction value.

15. The method according to claim 1, wherein the measuring device and a machine controller of the machine tool exchange necessary information and signals wirelessly or via a data line, wherein the machine controller of machine tool signals parameters relevant for measurement to the measuring device, and/or the measuring device signals results ascertained by it to the machine controller of the machine tool.

16. A device for checking a tool to be used in a numerically controlled machine tool, comprising:
a measuring device, having
a light emitter designed to emit a measuring beam for contactless scanning of the tool by means of the measuring beam, and a light beam receiver designed to receive the measuring beam and to emit a shadow signal representative of a degree of shading of the measuring beam by the tool;

an evaluation unit programmed and designed to
receive and process the shadow signal from the light beam receiver;

receive and process a signal from a machine controller of the machine tool about the rotation of the tool and movement of the rotating tool relative to the measuring beam;

initiate a message to the machine controller of the machine tool that the tool is reaching a starting position in which each cutting edge of the tool dips so far into the measuring beam, and in doing so shades this to such an extent, that a lower and an upper switching threshold of a measurement range of the evaluation unit is reached or undershot;

initiate a movement of the tool, which is rotating at a predetermined speed, out of the measuring beam at an at least approximately constant feed rate, starting out from said starting position, until a shortest cutting edge falls below the lower switching threshold, and register the shadow signal produced by each cutting edge of the tool on shading of the measuring beam in relation to a local and a temporal occurrence of the shadow signal during the movement of the rotating tool out of the measuring beam;

determine an event that, at least for one cutting edge of the tool, the shadow signal does not fall below the lower switching threshold of the measurement range and does not exceed the upper switching threshold of the measurement range, so that a maximum shadow signal produced during the movement of the rotating tool out of the measuring beam is located above the lower and below the upper switching threshold of the measurement range;

wherein—the feed rate in proportion to the measurement range of the evaluation unit, which range is dependent on a beam transverse measurement of the measuring beam, is determined such that, during at least one revolution of the rotating tool, at least one of the cutting edges produces at different positions a respective maximum shadow signal located above the lower and below the upper switching threshold of the measurement range;

with each revolution of the rotating tool the maximum shadow signals ascertained of each cutting edge
differ by an at least approximately constant offset amount according to a temporal delay of the tool and a spatial change of the tool, and
are superimposed to form a resultant representative shadow signal for this cutting edge.

\* \* \* \* \*